(12) United States Patent  (10) Patent No.: US 11,970,368 B2
Gurvich et al.  (45) Date of Patent: Apr. 30, 2024

(54) ELEVATOR SYSTEM BELT

(71) Applicant: Otis Elevator Company, Farmington, CT (US)

(72) Inventors: Mark R. Gurvich, Middletown, CT (US); Martin J. Hardesty, West Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 691 days.

(21) Appl. No.: 16/011,081

(22) Filed: Jun. 18, 2018

(65) Prior Publication Data

US 2019/0382241 A1 Dec. 19, 2019

(51) Int. Cl.
*B66B 7/06* (2006.01)
*F16G 1/28* (2006.01)

(52) U.S. Cl.
CPC ............. *B66B 7/062* (2013.01); *F16G 1/28* (2013.01); *D07B 2501/2007* (2013.01)

(58) Field of Classification Search
CPC B66B 7/062; D07B 5/005; D07B 2201/1004; D07B 2501/2007
See application file for complete search history.

(56) References Cited

U.S. PATENT DOCUMENTS

| 6,295,799 | B1 * | 10/2001 | Baranda | B66B 7/062 |
| | | | | 57/221 |
| 6,364,061 | B2 * | 4/2002 | Baranda | B66B 7/06 |
| | | | | 57/232 |
| 6,368,324 | B1 | 4/2002 | Dinger et al. | |
| 6,386,324 | B1 | 5/2002 | Baranda et al. | |
| 8,479,888 | B2 * | 7/2013 | Goser | B66B 7/062 |
| | | | | 187/255 |
| 9,352,935 | B2 * | 5/2016 | Baranda | B66B 7/06 |
| 9,695,014 | B2 * | 7/2017 | Begle | B66B 7/062 |
| 2011/0000746 | A1 * | 1/2011 | Pelto-Huikko | D07B 1/04 |
| | | | | 524/556 |
| 2011/0226563 | A1 * | 9/2011 | Goser | B66B 7/062 |
| | | | | 187/411 |

(Continued)

FOREIGN PATENT DOCUMENTS

CN 201228189 Y 4/2009
CN 102575420 A 7/2012

(Continued)

OTHER PUBLICATIONS

CN103434915A English Translation.*

(Continued)

*Primary Examiner* — Minh Truong
(74) *Attorney, Agent, or Firm* — CANTOR COLBURN LLP

(57) ABSTRACT

A belt for an elevator system includes one or more tension members extending along a belt length, and a jacket at least partially encapsulating the one or more tension members. The jacket defines a traction surface configured to interface with a traction sheave of the elevator system, a back surface opposite the traction surface, and two edge surfaces extending between the traction surface and the back surface. The traction surface includes a convex shaped segment extending at least partially across the traction surface between the two edge surfaces.

2 Claims, 8 Drawing Sheets

(56) References Cited

U.S. PATENT DOCUMENTS

| | | | |
|---|---|---|---|
| 2014/0305744 A1* | 10/2014 | Kere | D07B 1/145 187/254 |
| 2018/0009634 A1 | 1/2018 | Guilani et al. | |
| 2019/0023535 A1* | 1/2019 | Valjus | B66B 15/04 |

FOREIGN PATENT DOCUMENTS

| | | |
|---|---|---|
| CN | 102713053 A | 10/2012 |
| CN | 104649097 A | 5/2015 |
| CN | 104653705 A | 5/2015 |
| CN | 204508496 U | 7/2015 |
| CN | 103145021 B | 4/2016 |
| CN | 103663057 B | 8/2016 |
| CN | 105947850 A | 9/2016 |
| CN | 106006322 A | 10/2016 |
| CN | 106144838 A | 11/2016 |
| CN | 103434915 B | 12/2016 |
| CN | 106744158 A | 5/2017 |
| DE | 102011002796 A1 | 7/2012 |
| EP | 3015413 B1 | 8/2017 |
| WO | 0059819 A2 | 10/2000 |
| WO | 2009041970 A1 | 4/2009 |
| WO | 2012025278 A1 | 3/2012 |
| WO | 2013070224 A1 | 5/2013 |

OTHER PUBLICATIONS

Chinese Office Action for Chinese Application No. 201910521275. 2, dated Jul. 3, 2020, 12 pages.

Hinterholzer et al., "Research on a Pipe Conveyor with a Completelyl New Belt Guidance", retrieved May 4, 2018, pp. 1-8, retrieved from http://www.ckit.co.za/right-index/tech-focus/belt-guide/new-belt-guidance.htm.

European Search Report Issued in EP Application No. 19181052.2, dated Dec. 17, 2019, 8 Pages.

Chinese Office Action for Chinese Application No. 201910521275. 2; dated Aug. 16, 2021.

1 European Search Report for European Application No. 19181052. 2; dated Mar. 25, 2022; 6 pages.

* cited by examiner

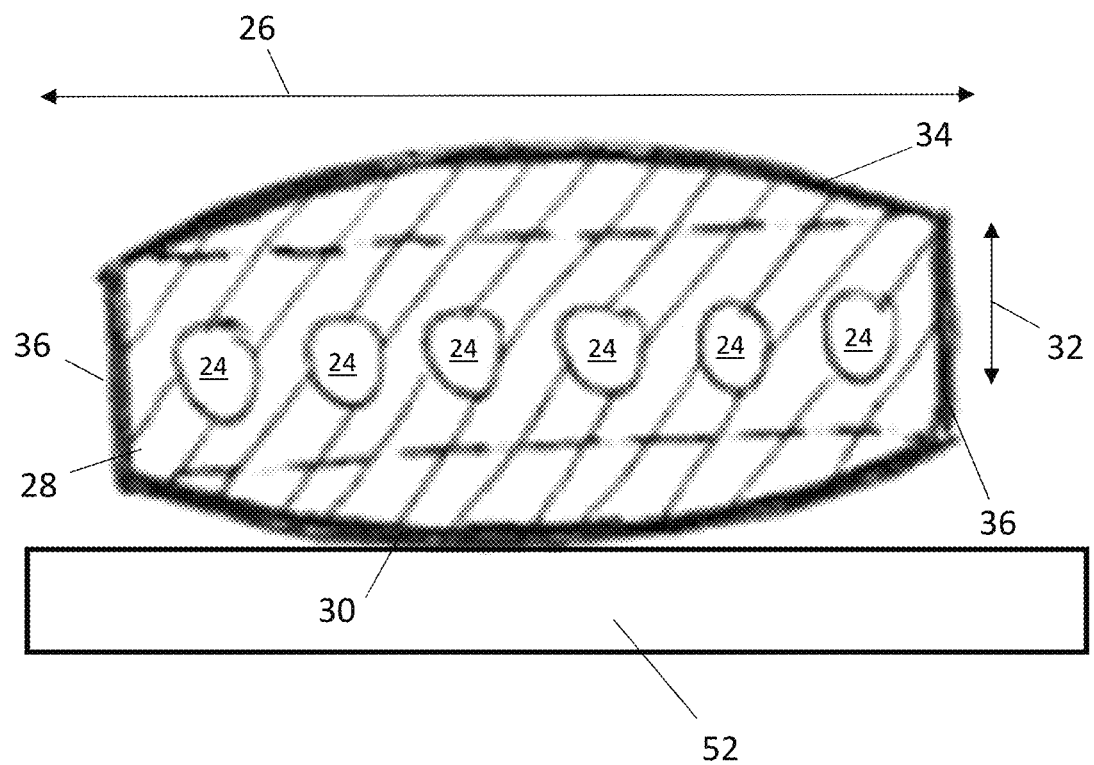

ELEVATOR SYSTEM BELT

BACKGROUND

Exemplary embodiments pertain to the art of elevator systems. More particularly, the present disclosure relates to belts to suspend and/or drive elevator cars of elevator systems.

Elevator systems utilize a suspension member operably connected to an elevator car and a counterweight in combination with, for example, a machine and traction sheave, to suspend and drive the elevator car along a hoistway. In some systems, the suspension member is a belt having one or tension members retained in a jacket. The tension members may be formed from, for example, steel wires or other materials, such as a carbon fiber composite. The tension members support the load and the jacket hold the tension members and transfers shear forces to the traction sheave.

A typical belt has a flat, planar, traction surface to interface with a traction sheave of the elevator system. Other belts, such as those utilized in elevator systems where the traction sheave has a convex crown, have complimentary concave traction surfaces, and in some cases, convex back surfaces opposite the traction surfaces.

BRIEF DESCRIPTION

In one embodiment, a belt for an elevator system includes one or more tension members extending along a belt length, and a jacket at least partially encapsulating the one or more tension members. The jacket defines a traction surface configured to interface with a traction sheave of the elevator system, a back surface opposite the traction surface, and two edge surfaces extending between the traction surface and the back surface. The traction surface includes a convex shaped segment extending at least partially across the traction surface between the two edge surfaces.

Additionally or alternatively, in this or other embodiments the convex shaped segment has one of a non-zero uniform curvature or variable curvature from a first edge surface of the two edge surfaces to a second edge surface of the two edge surfaces.

Additionally or alternatively, in this or other embodiments the traction surface includes a planar first segment extending from a first edge segment of the two edge segments, a second segment abutting the first segment, and a planar third segment abutting the second segment and extending to a second edge surface of the two edge surfaces.

Additionally or alternatively, in this or other embodiments the second segment is one of planar or convexly curved.

Additionally or alternatively, in this or other embodiments the traction surface includes a first segment having a convex curvature extending from a first edge segment of the two edge segments, a planar second segment abutting the first segment, and a third segment having a convex curvature abutting the second segment and extending to a second edge surface of the two edge surfaces.

Additionally or alternatively, in this or other embodiments the traction surface includes two or more segments with at least one of them a planar segment.

Additionally or alternatively, in this or other embodiments the back surface includes convex shape extending at least partially across the back side between the two edge surfaces.

Additionally or alternatively, in this or other embodiments the back side includes a concave surface extending at least partially across the back side between the two edge surfaces.

Additionally or alternatively, in this or other embodiments the one or more tension members includes a tension member formed from a plurality of steel wires.

Additionally or alternatively, in this or other embodiments the one or more tension members includes a tension member formed from a plurality of fibers located in a polymeric matrix material.

In another embodiment, an elevator system includes a hoistway, an elevator car located in and movable along the hoistway, a traction sheave operably connected to the elevator car to urge movement of the elevator car along the hoistway. A suspension member is routed across the traction sheave and operably connected to the elevator car. The suspension member includes one or more tension members extending along a belt length, and a jacket at least partially encapsulating the one or more tension members. The jacket defines a traction surface configured to interface with the traction sheave, a back surface opposite the traction surface, and two edge surfaces extending between the traction surface and the back surface. The traction surface includes a convex curvature extending at least partially across the traction surface between the two edge surfaces.

Additionally or alternatively, in this or other embodiments the traction sheave has a flat or at least partially concave profile across a lateral width of the traction sheave.

Additionally or alternatively, in this or other embodiments the convex shaped segment of the traction surface has one of a uniform curvature or variable curvature from a first edge surface of the two edge surfaces to a second edge surface of the two edge surfaces.

Additionally or alternatively, in this or other embodiments the traction surface includes a planar first segment extending from a first edge segment of the two edge segments, a second segment abutting the first segment, and a planar third segment abutting the second segment and extending to a second edge surface of the two edge surfaces.

Additionally or alternatively, in this or other embodiments the second segment is one of planar or convexly curved.

Additionally or alternatively, in this or other embodiments the traction surface includes a first segment having a convex curvature extending from a first edge segment of the two edge segments, a planar second segment abutting the first segment, and a third segment having a convex curvature abutting the second segment and extending to a second edge surface of the two edge surfaces Additionally or alternatively, in this or other embodiments the traction surface includes two or more segments with at least one of them a planar segment.

Additionally or alternatively, in this or other embodiments the back surface of the belt includes at least partial convex shape in addition to the convex shape at the traction surface.

Additionally or alternatively, in this or other embodiments the back side of the belt includes a concave surface extending at least partially across the back side between the two edge surfaces.

Additionally or alternatively, in this or other embodiments the one or more tension members includes one or more of a tension member formed from a plurality of steel wires or a tension member formed from a plurality of fibers located in a matrix material.

BRIEF DESCRIPTION OF THE DRAWINGS

The following descriptions should not be considered limiting in any way. With reference to the accompanying drawings, like elements are numbered alike:

FIG. 2 is a cross-sectional view of an embodiment of an elevator system belt;

DETAILED DESCRIPTION

A detailed description of one or more embodiments of the disclosed apparatus and method are presented herein by way of exemplification and not limitation with reference to the Figures.

Figure 1:
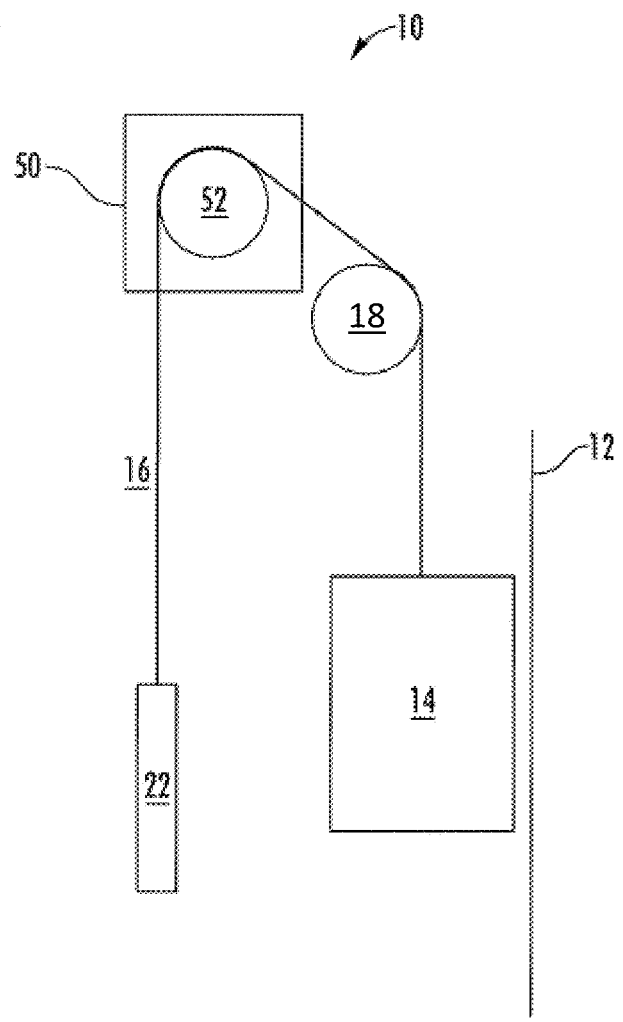
FIG. 1 is a schematic illustration of an elevator system.

Shown in FIG. 1 is a schematic view of an exemplary traction elevator system 10. Features of the elevator system 10 that are not required for an understanding of the present invention (such as the guide rails, safeties, etc.) are not discussed herein. The elevator system 10 includes an elevator car 14 operatively suspended or supported in a hoistway 12 with one or more suspension members, for example belts 16. While the following description, belts 16 are the suspension members utilized in the elevator system, one skilled in the art will readily appreciate that the present disclosure may be utilized with other suspension members, such as ropes. The one or more belts 16 interact with sheaves 18 and 52 to be routed around various components of the elevator system 10. Sheave 18 is configured as a diverter, deflector or idler sheave and sheave 52 is configured as a traction sheave, driven by a machine 50. Movement of the traction sheave 52 by the machine 50 drives, moves and/or propels (through traction) the one or more belts 16 that are routed around the traction sheave 52. Diverter, deflector or idler sheaves 18 are not driven by a machine 50, but help guide the one or more belts 16 around the various components of the elevator system 10. The one or more belts 16 could also be connected to a counterweight 22, which is used to help balance the elevator system 10 and reduce the difference in belt tension on both sides of the traction sheave during operation. The sheaves 18 and 52 each have a diameter, which may be the same or different from each other.

In some embodiments, the elevator system 10 could use two or more belts 16 for suspending and/or driving the elevator car 14 In addition, the elevator system 10 could have various configurations such that either both sides of the one or more belts 16 engage the sheaves 18, 52 or only one side of the one or more belts 16 engages the sheaves 18, 52. The embodiment of FIG. 1 shows a 1:1 roping arrangement in which the one or more belts 16 terminate at the car 14 and counterweight 22, while other embodiments may utilize other roping arrangements.

The belts 16 are constructed to meet belt life requirements and have smooth operation, while being sufficiently strong to be capable of meeting strength requirements for suspending and/or driving the elevator car 14 and counterweight 22.

FIG. 2 provides a cross-sectional schematic of an exemplary belt 16 construction or design. The belt 16 includes a plurality of tension members 24 extending longitudinally along the belt 16 and arranged across a belt width 26. The tension members 24 are at least partially enclosed in a polymeric jacket 28 to restrain movement of the tension members 24 in the belt 16 with respect to each other and to protect the tension members 24. The jacket 28 defines a traction side 30 configured to interact with a corresponding surface of the traction sheave 52. A primary function of the jacket 28 is to provide a sufficient friction between the belt 16 and the traction sheave 52 to produce a desired amount of traction therebetween. The jacket 28 should also transmit the traction loads to the tension members 24. In addition, the jacket 28 should be wear resistant and protect the tension members 24 from impact damage, exposure to environmental factors, such as chemicals, for example.

The belt 16 has a belt width 26 and a side belt thickness 32, with an aspect ratio of belt width 26 to belt thickness 32 greater than one. The belt 16 further includes a back side 34 opposite the traction side 30 and belt edges 36 extending between the traction side 30 and the back side 34. While sides 36 are illustrated as flat surfaces, other shapes of sides 36, for example, fully or partially convex or concave, may be used in other embodiments. While six tension members 24 are illustrated in the embodiment of FIG. 2, other embodiments may include other numbers of tension members 24, for example, 4, 10 or 12 tension members 24. Further, while the tension members 24 of the embodiment of FIG. 2 are substantially identical, in other embodiments, the tension members 24 may differ from one another. Also, while the tension members 24 of the embodiments of FIG. 2 are illustrated with uniform positions, in other embodiments, positions of the tension members 24 may be non-uniform in either width direction, or thickness direction, or both.

Figure 3A:
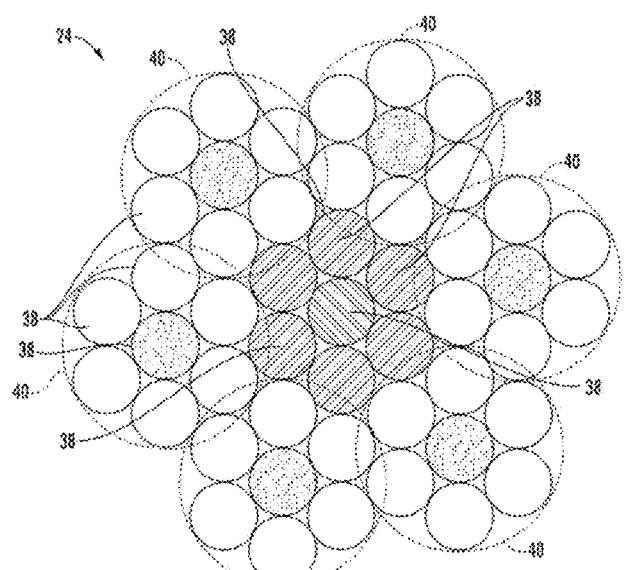
FIG. 3A is a cross-sectional view of an embodiment of a tension member for an elevator belt.
Figure 3B:
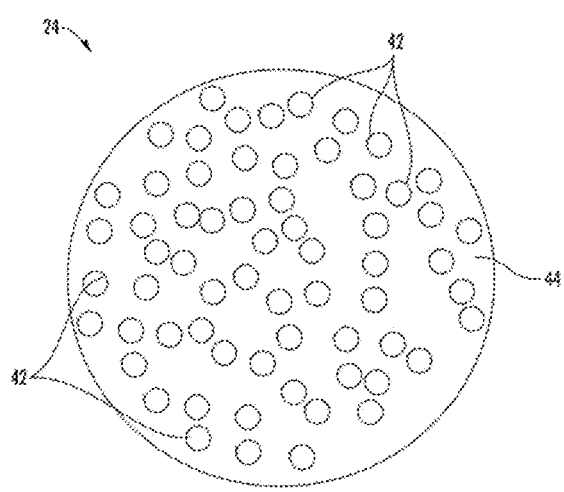
FIG. 3B is another cross-sectional view of an embodiment of a tension member for an elevator belt.
Figure 4:
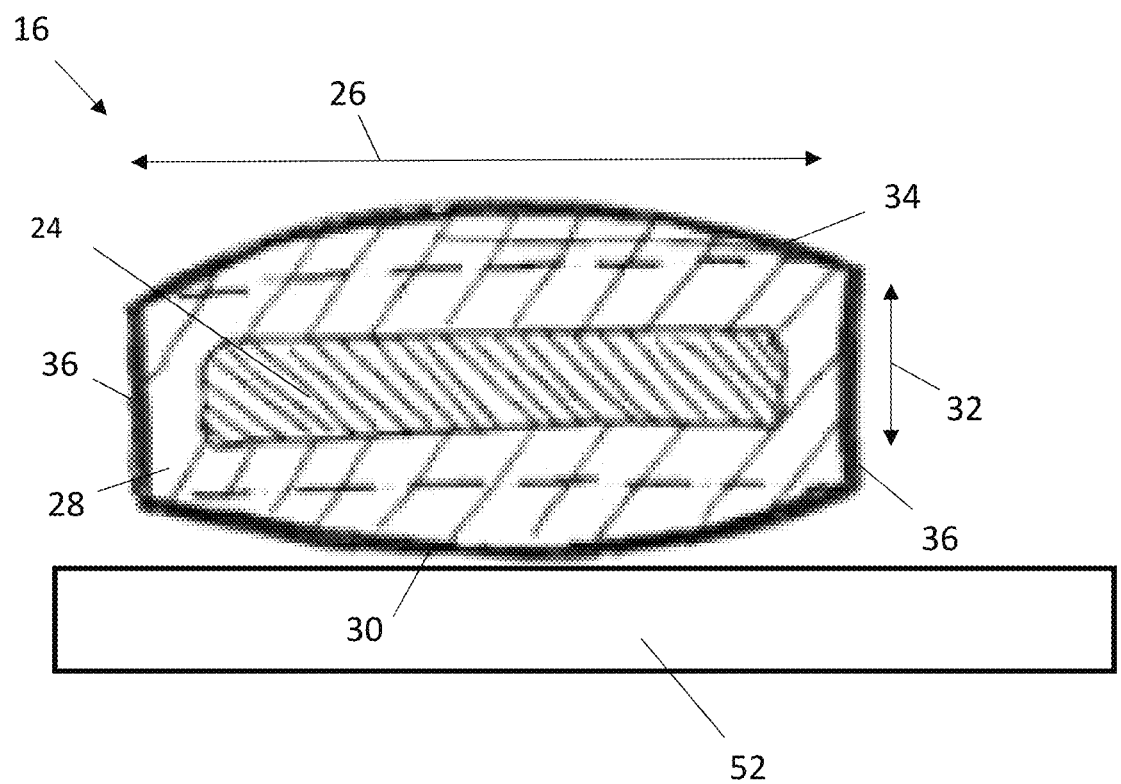
FIG. 4 is another cross-sectional view of an embodiment of an elevator system belt.

Referring now to FIG. 3A, the tension member 24 may be a plurality of wires 38, for example, steel wires 38, which in some embodiments are formed into one or more strands 40. In other embodiments, such as shown in FIG. 3B, the tension member 24 may include a plurality of fibers 42, such as carbon fiber, Kevlar® fiber or other aramid fibers, glass fiber, other fibers, or their combination, disposed in a matrix material 44. Materials such as polyurethane, vinylester, or epoxy may be utilized as the matrix material, as well as other thermoset materials and, for example, thermoset polyurethane materials. Thermoplastic materials may be utilized as the matrix materials as well. While a circular cross-sectional tension member geometry is illustrated in the embodiment of FIG. 3B, other embodiments may include different tension member cross-sectional geometries, such as rectangular as shown in FIG. 4 or ellipsoidal. While the cross-sectional geometries of the tension members 24 in FIG. 2 are shown as identical, in other embodiment the tension members' cross-sectional geometries may differ from one another.

Referring again to FIG. 2, the traction side 30 and the back side 34 each have a convex profile along the belt width 26 direction. The convex profile of the traction side 30, especially when combined with a traction sheave 52 having a flat profile such as shown in FIG. 2, improves tracking of the belt 16 at the traction sheave 52 and improves wear characteristics of the traction side 30 of the belt 16. The convex profile of the back side 34 similarly provides benefits in tracking and wear as the back side 34 passes over sheaves 18. In case of non-flat profile of a traction sheave 52, for example, a convex one, additional benefits in tracking and wear may be expected as well.

Figure 5:
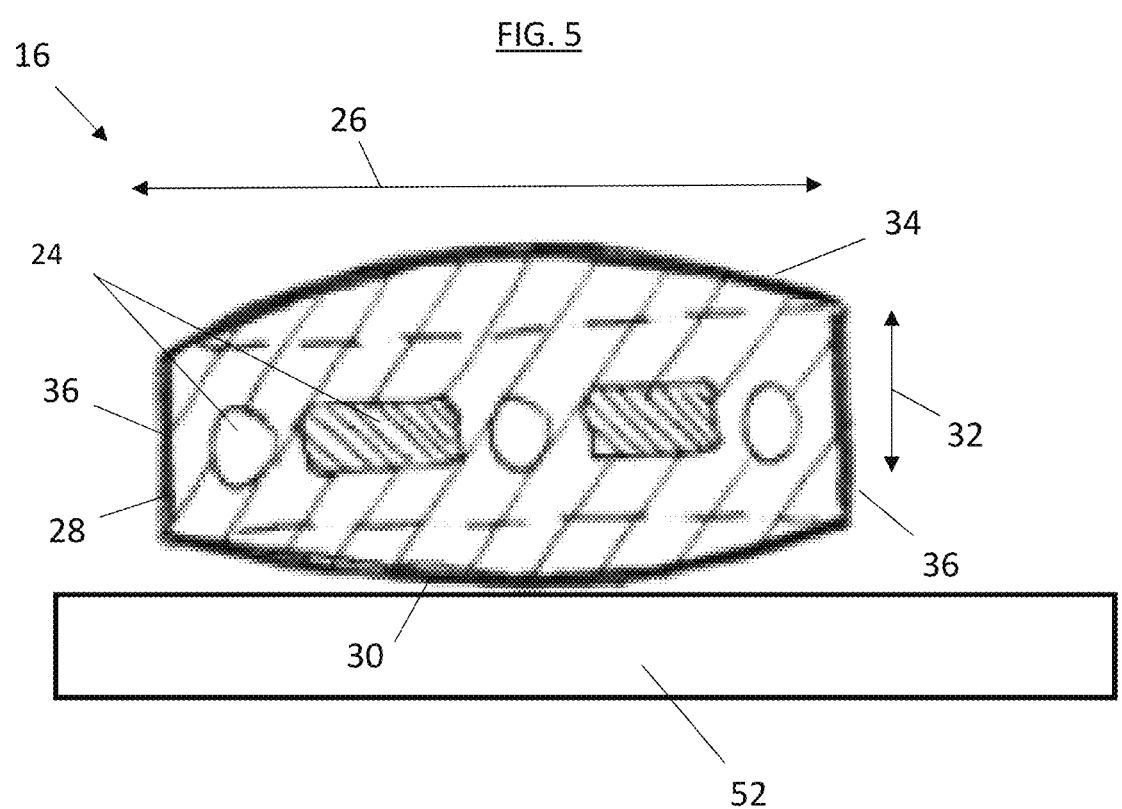
FIG. 5 is yet another cross-sectional view of an embodiment of an elevator system belt.

It is to be appreciated that, while circular tension elements 24, such as those formed from steel wires are shown in FIG. 2, and tension members 24 formed from a plurality of fibers disposed in a matrix material are shown in FIG. 4, the types of tension elements 24 may be mixed in the belt, such as shown in FIG. 5.

Figure 6:
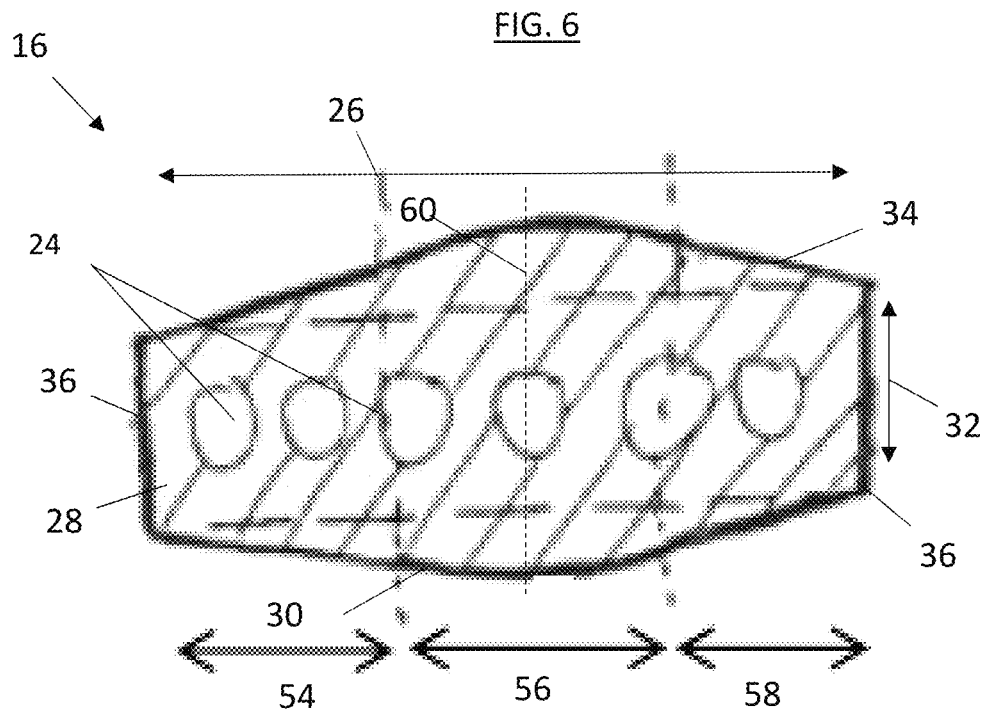
FIG. 6 is still another cross-sectional view of an embodiment of an elevator system belt.
Figure 7:
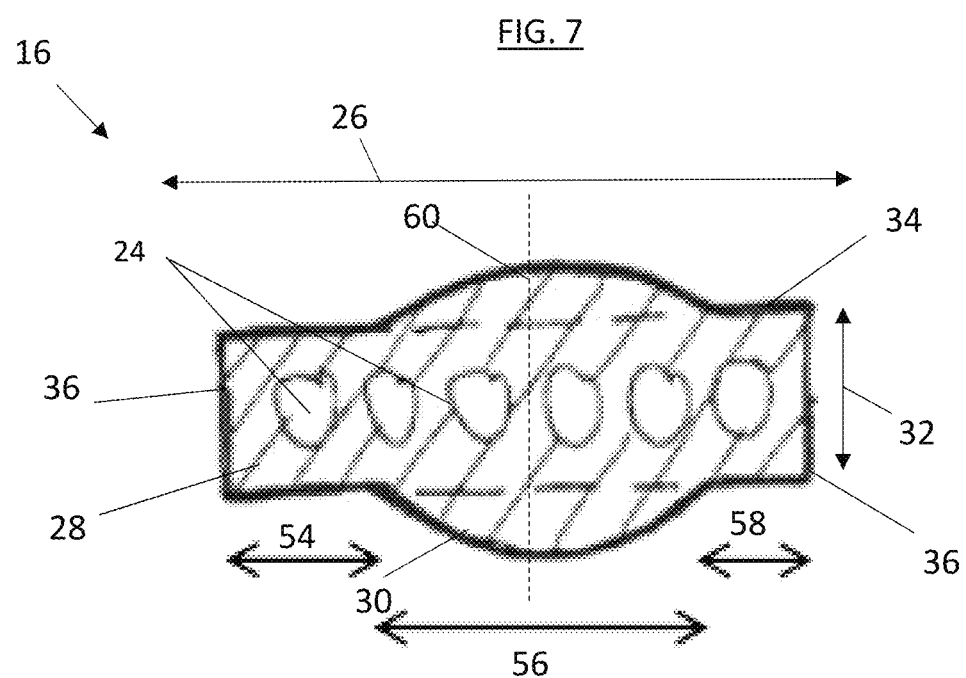
FIG. 7 is another cross-sectional view of an embodiment of an elevator system belt.

In some embodiments, such as shown in FIG. 2, the entire traction side 32 and/or the back side 34 possesses either constant or variable non-zero curvature. Here, curvature is defined according to typically assumed mathematical meanings as a value inverse to the surface radius. For example, in case of a flat surface, its radius is infinite, and the corresponding curvature, therefore, is equal to zero. In case of non-flat surface, its radius has a finite value, and its curvature therefore is non-zero, with highest curvature at smaller radius. In other embodiments, such as shown in FIGS. 6 and 7, the traction side 30 and/or the back side 34 may have different segments with either zero curvature (flat segments) and non-zero curvatures (segments with finite constant or variable curvatures). In the embodiment of FIG. 6, the traction side 30 has a first segment 54 extending from the first belt edge 36 having a constant slope (i.e., with zero curvature), a second segment 56 abutting the first segment 54 and having a convex shape with non-zero curvature, and a third segment 58 extending from the second segment 56 to the second belt edge 36 and having a constant slope (i.e., zero curvature). While three segments are illustrated in FIG. 6, one skilled in the art will appreciate that a greater number of segments may be utilized. Further, in some embodiments, the second segment may be located at a lateral center 60 of the belt 16.

Referring to FIG. 7, in another embodiment, the first segment 54 is parallel to the third segment 58, with a convex-shaped second segment 56 located between the first segment 54 and the third segment 58. In some embodiments, a lateral length of the segments 54, 56, 58 are equal, while in other embodiments, the segment 54, 56, 58 lengths are unequal. For example, the second segment 56 length may be greater than the first segment 54 length and the third segment 58 length. In some embodiments, the first segment 54 length is equal to the third segment 58 length.

Figure 8:
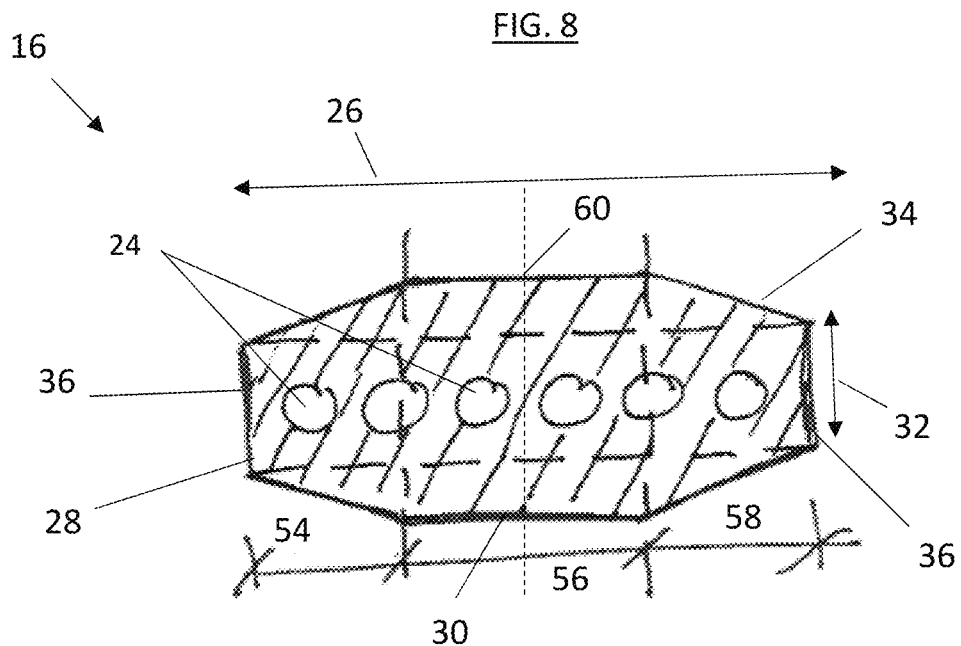
FIG. 8 is yet another cross-sectional view of an embodiment of an elevator system belt.

In another embodiment illustrated in FIG. 8, the traction side 30 is formed from three segments 54, 56, 58 each having a constant slope (i.e., with zero curvature), with none of the segments parallel to each other. The second segment 56 may be parallel to a corresponding second segment 56 of the back side 34. While three segments are illustrated in FIG. 6, one skilled in the art will appreciate that a greater number of segments may be utilized. Similarly, a design with just two segments with constant slope each (i.e., with a triangular shape) may be utilized at either traction side 30 or back side 34 or both.

Figure 9:
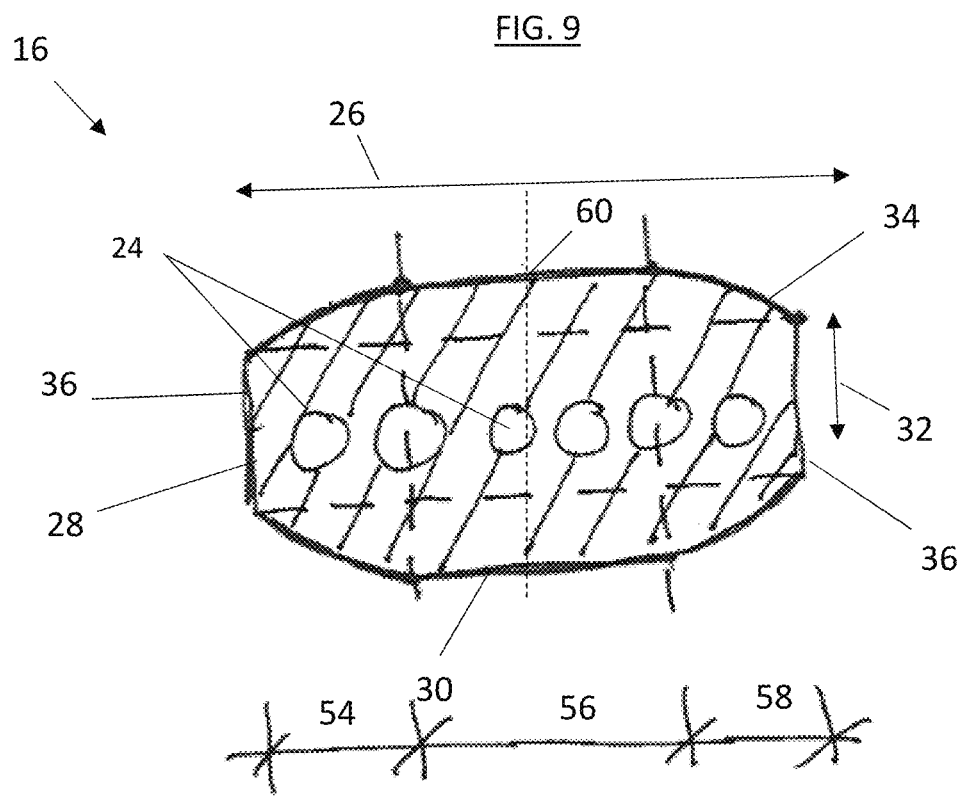
FIG. 9 is still another cross-sectional view of an embodiment of an elevator system belt.

Further, in some embodiments, the second segment 56 may be located at a lateral center 60 of the belt 16. In another embodiment illustrated in FIG. 9, the first segment 54 and the third segment 58 each have a non-zero convex curvature, while the second segment 56 is flat, and has zero curvature. Additionally, the second segment 56 of traction side 30 may be parallel to the corresponding second segment 56 of the back side 34. While three segments are illustrated in FIG. 7, one skilled in the art will appreciate that a profile consisting of greater number of flat and non-flat segments may be utilized.

Variants of implementations illustrated at FIGS. 6-9 may have segments with either uniform or non-uniform lengths. Similarly, these variants may have either uniform or non-uniform geometrical definitions, such as, for example, slopes or curvatures. Also, the traction side 30 and the back side 34 may have the same or different shapes defined by either multiple segments as illustrated at FIGS. 6-9 or by one segment as illustrated at FIGS. 2, 4, 5.

Figure 10:
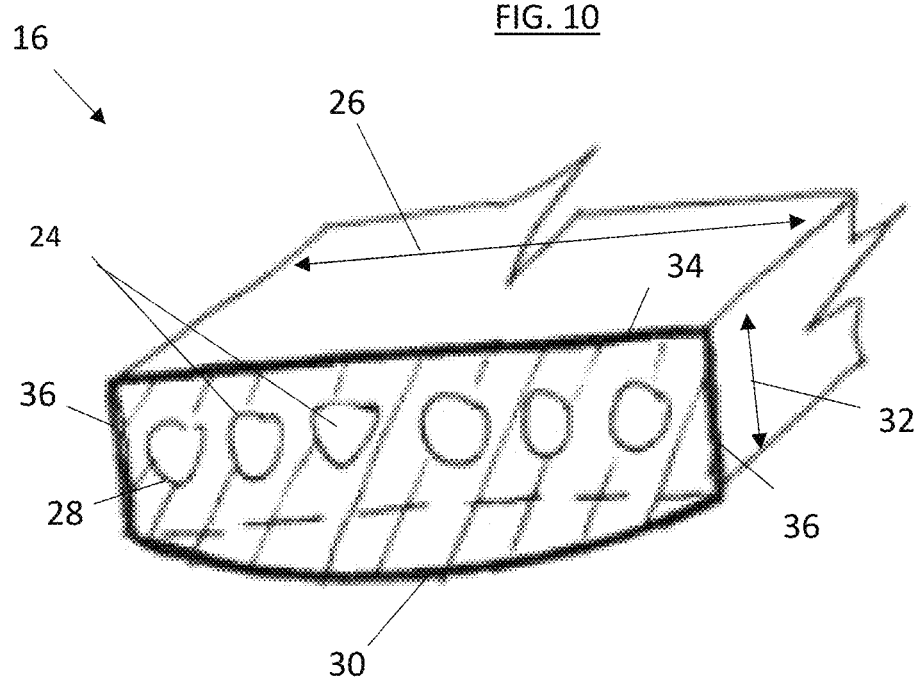
FIG. 10 is a cross-sectional view of another embodiment of an elevator system belt.
Figure 11:
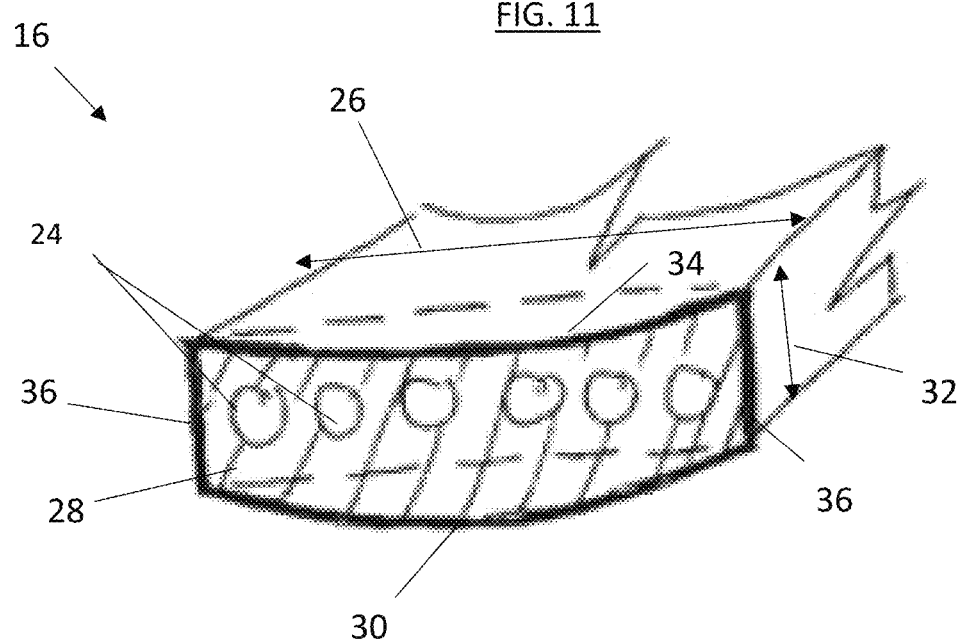
FIG. 11 is a cross-sectional view of yet another embodiment of an elevator system belt.

In some embodiments, the belt 16 is substantially symmetrical, with both the traction side 30 and the back side 34 having the same convex shapes. It is to be appreciated, however, that the belt 16 may be constructed asymmetrically, such that the traction side 30 differs from the back side 34. For example, as shown in FIG. 10, the traction side 30 has the convex shape while the back side 34 is flat. As another example, as shown in FIG. 11, the belt 16 may be constructed such that the traction side 30 has the convex shape and the back side 34 has a concave shape. In some embodiments, the radius of the convex curvature may be equal to the radius of the concave curvature.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A belt and traction sheave arrangement for an elevator system, comprising:
    a traction sheave; and
    a belt including:
        a single tension member extending along a belt length, the single tension member rectangular in shape and formed from a plurality of fibers disposed in a polymeric matrix material; and
        a jacket at least partially encapsulating the tension member, the jacket defining:
            a traction surface configured to interface with the traction sheave;
            a back surface opposite the traction surface; and
            two edge surfaces extending from the traction surface to the back surface at opposing lateral sides of the belt;

wherein the traction surface includes a first convex shaped segment extending from a first edge surface of the two edge surfaces to a second edge surface of the two edge surfaces;

wherein the convex shaped segment of the traction surface is configured to interface with a flat profile surface of the traction sheave, the flat profile surface extending at least from the first edge surface to the second edge surface;

wherein the back surface includes a second convex shaped segment extending from the first edge surface to the second edge surface, the second convex shaped segment having a same profile as the first convex shaped segment;

wherein the convex shaped segment of the traction surface has a variable non-zero curvature from the first edge surface of the two edge surfaces to the second edge surface of the two edge surfaces.

2. An elevator system, comprising:

a hoistway;

an elevator car disposed in and movable along the hoistway;

a traction sheave operably connected to the elevator car to urge movement of the elevator car along the hoistway, the traction sheave including a first profile surface; and a suspension member routed across the traction sheave and operably connected to the elevator car, the suspension member including:

one or more tension members extending along a belt length; and a jacket at least partially encapsulating the one or more tension members, the jacket defining:

a traction surface configured to interface with the traction sheave;

a back surface opposite the traction surface; and two edge surfaces extending from the traction surface to the back surface at opposing lateral sides of the belt;

wherein the traction surface includes a second profile surface having a convex curvature extending from a first edge surface of the two edge surfaces to a second edge surface of the two edge surfaces;

wherein the traction surface interfaces with the first profile surface of the traction sheave;

wherein the first profile surface is flat at least from the first edge surface to the second edge surface;

wherein the back surface includes a convex shaped segment extending from the first edge surface to the second edge surface, the convex shaped segment having a same profile as the second profile surface;

wherein the convex shaped segment of the traction surface has a variable non-zero curvature from the first edge surface of the two edge surfaces to the second edge surface of the two edge surfaces.

* * * * *